US006950028B2

(12) United States Patent
Zweig

(10) Patent No.: US 6,950,028 B2
(45) Date of Patent: Sep. 27, 2005

(54) ELECTRONIC TIME-TEMPERATURE INDICATOR

(76) Inventor: Stephen Eliot Zweig, 224 Vista de Sierra, Los Gatos, CA (US) 95030

( * ) Notice: Subject to any disclaimer, the term of this patent is extended or adjusted under 35 U.S.C. 154(b) by 81 days.

(21) Appl. No.: 10/634,297

(22) Filed: Aug. 5, 2003

(65) Prior Publication Data

US 2004/0212507 A1 Oct. 28, 2004

Related U.S. Application Data

(60) Provisional application No. 60/465,434, filed on Apr. 25, 2003.

(51) Int. Cl.[7] .............................................. G08B 17/00
(52) U.S. Cl. ........................ 340/588; 340/584; 702/130
(58) Field of Search ................................ 340/588, 584, 340/585, 5.1, 5.9, 5.92; 702/99, 104, 130

(56) References Cited

U.S. PATENT DOCUMENTS

| | | | |
|---|---|---|---|
| 4,536,851 A | | 8/1985 | Germanton et al. |
| 5,313,848 A | | 5/1994 | Santin et al. |
| 5,667,303 A | | 9/1997 | Arens et al. |
| 5,867,809 A | * | 2/1999 | Soga et al. .................. 702/130 |
| RE36,200 E | | 4/1999 | Berrian et al. |
| 6,034,607 A | * | 3/2000 | Vidaillac ..................... 340/585 |
| 6,217,213 B1 | | 4/2001 | Curry et al. |
| 6,320,512 B1 | | 11/2001 | Nicholson et al. |
| 6,359,565 B1 | * | 3/2002 | Pedoeem et al. ........... 340/584 |
| 6,544,925 B1 | | 4/2003 | Prusik et al. |
| 6,549,135 B2 | * | 4/2003 | Singh et al. ................. 340/584 |
| 6,771,177 B2 | * | 8/2004 | Alderman .................... 340/585 |

FOREIGN PATENT DOCUMENTS

WO    WO0125472 A1    4/2001

* cited by examiner

*Primary Examiner*—Anh V. La

(57) ABSTRACT

This invention covers electronic time-temperature indicators with a visual output, and other devices and methods by which the thermal history of a material may be monitored, and the subsequent fitness for use of the tracked material may be quickly ascertained. In particular, the invention discloses a rapidly reprogrammable electronic time-temperature tag that may be easily customized with the thermal time-temperature stability profile of an arbitrary material, using electronic data transfer methods. Using this device, a single, low-cost, generic time-temperature tag may be mass-produced, and then subsequently programmed to mimic the stability characteristics of nearly any material of interest.

33 Claims, 8 Drawing Sheets

ELECTRONIC TIME-TEMPERATURE INDICATOR

This application claims the priority benefit of provisional patent application 60/465,434, "Electronic time-temperature indicator", filed Apr. 25, 2003.

BACKGROUND OF THE INVENTION

1. Field of the Invention

This invention covers electronic time-temperature indicators with a visual output, and other devices and methods by which the thermal history of a material may be monitored, and the subsequent fitness for use of the tracked material may be quickly ascertained by visual or other means.

2. Description of the Related Art

Many materials in use in commerce, medicine, and other areas are perishable. That is, the materials have a tendency to deteriorate with time, and this tendency to deteriorate is often accelerated by exposure to higher temperatures. This tendency to deteriorate is often designated as a material's "stability". A material that deteriorates slowly in response to higher temperatures over long periods of time is said to have a "high stability". By contrast, a material that deteriorates quickly in response to higher temperatures is said to have a "low stability".

Examples of deterioration includes spoilage in the case of biological materials, loss of potency in the case of drugs, loss of chemical reactivity in the case of chemicals, or alternatively formation of unwanted contaminants, etc. Excessive deterioration eventually results in the material in question being rendered unfit to use, or even rendered dangerous. Thus for commerce, medicine, and other areas, the rapid detection of materials rendered unfit to use by an unacceptable thermal history is very important.

Additionally, there are alternative situations where a material must undergo a certain minimal thermal history before it becomes fit for use. There are many materials, and material treatment processes, commonly used for construction, manufacturing, food preparation, and pharmaceutical preparation, such as concrete setting, epoxy hardening, biological fermentation, cooking, pasteurization, sterilization and the like, where the material needs to be properly cured, incubated, or heat treated before the material is fit to use. Since curing, incubation, or heat treatment processes are often temperature dependent, typically taking longer to proceed at lower temperatures, such materials must undergo a certain minimal time-temperature history before they are fit for use.

As a result, visual time-temperature indicators are widely used in many areas of commerce. These are typically small devices that are affixed to a container of thermally sensitive material.

Visual time-temperature indicators are often used to verify that a perishable, temperature sensitive, product has been transported from the manufacturer to the user via a transport process that has preserved the "cold chain". Here, a "cold chain" means a continuous system for conserving and preserving materials at precise temperatures from production to use, so that the integrity of the materials is assured.

There are many different types of visual time-temperature indicator in present-day use. Many are chemically based. For example, LifeLines technologies, Morris Plains, N.J., produces the Heatmarker® Time-temperature indicator for medical use. This indicator, often used to insure the integrity of vaccines in third-world countries, relies upon the progressive darkening of a chemical indicator, normally placed in the center of a "bulls eye" visual calorimetric reference pattern. Upon initial production, the chemical indicator is light in color, and the center of the "bulls eye" is lighter than the surrounding area. However upon exposure to an excessive amount of temperature for an excessive amount of time, the center of the bull's eye becomes darker than the surrounding area. A user may thus quickly and easily assess the integrity of any material associated with the indicator by simply noting if the center of the bulls eye is lighter or darker than the surrounding colorimetric reference material.

The chemistry techniques underlying this methodology is disclosed by Baughman et. al. in U.S. Pat. No. 4,389,217, Prusik et. al. in U.S. Pat. No. 6,544,925; and in other patents.

An alternative chemically based visual time-temperature indicator is the MonitorMark™ indicator, produced by the 3M corporation, Saint Paul, Minn. The MonitorMark uses a wicking material, along with a colored indicator that slowly migrates up the wick at a rate that is dependent on time and temperature. The user may thus quickly ascertain how far up the wick the colored indicator has migrated, and quickly assess if the material associated with the time-temperature indicator is fit to use.

The chemistry techniques underlying this technology is disclosed by Arens et. al. in U.S. Pat. No. 5,667,303, and in subsequent patents.

3M Corporation also produces the Comply™ dry heat chemical indicator strip. This strip allows the user to visually assess a material's adequate exposure to time and temperature in a dry heat sterilizer. If the strip does not show a proper level of color change, than the material has not been exposed to an adequate level of temperature and time necessary to assure sterility.

There are other types of time-temperature indicator that do not produce a visible output, but rather require the use of instruments to interrogate the indicator, and determine the state of the indicator. For example, the Bioett Corporation, Sweden, produces a radio frequency identification (RFID) non-visual time-temperature indicator. This indicator combines a passive RFID unit with an enzyme based degradable circuit component, such that as the indicator is exposed to excessive amounts of temperature for excessive amounts of time, the RFID signature of the tag changes.

The techniques underlying this methodology are disclosed by Sjoholm et. al. in WIPO application WO0125472A1.

Although this approach lends itself to very low cost time-temperature sensors, the lack of visual output is inconvenient for most users, who typically are not equipped with sophisticated RFID reading equipment. As a result, users without this specialized equipment will be unable to ascertain the status of the sensor. An additional drawback of Sjoholm et. al. is that the precise stability characteristics of this device are dependent upon tuning the specific degradation of a chemically based (enzymatic) time-temperature sensor to match the degradation characteristics of an arbitrary product. This is a time-consuming and burdensome process that may not always result in a precise stability match between the characteristics of the chemical time-temperature indicator, and the characteristics of the monitored material.

In addition to time-temperature monitors, which integrate time and temperature, and then make some sort of internal judgment as to if the unit has exceeded some preset criteria, there are a number of time-temperature data logging devices on the market. These logging devices typically store a record of the temperature history of the logger, and make the detailed history available for download to the user. However data loggers of prior art do not attempt to interpret this detailed history. Thus for prior art data logger devices, the interpretation of the relatively long and complex table of time and temperature log entries generated by the logger usually requires downloading the data, followed by a relatively sophisticated analysis by the user. It is clear that such devices impose a considerable burden on unsophisticated users, who simply want to know if the material associated with the device is appropriate for use or not.

One example of a prior art data logger device is the Dallas Semiconductor iButton Thermochron series of temperature logger products. This data logger consists of a roughly ¾ inch diameter metal button that contains an internal battery, thermocouple, microprocessor, and data storage means. The iButton takes up to one million temperature readings over a time period of up to ten years, and stores these readings in its internal memory. Users may access the data by making electrical contact with the iButton through its 1-Wire electrical interface, and downloading the data into a computerized reader. This data then may be manipulated as the user desires, and assessments of the degradation status of the associated product may subsequently be made after additional analysis.

The techniques underlying these methods are taught by Curry et. al. in U.S. Pat. No. 6,217,213.

Other data loggers are also on the market. These include the HOBO time-temperature data logger produced by Onset Computer Corporation, Pocasset, Mass., and others. As does the Thermochron product, these other data loggers also acquire data from temperature sensors, store the data and time in an onboard memory, and make the data available for download and subsequent analysis by sophisticated users.

Electromechanical data loggers are also on the market. For example, the Monitor In-transit temperature recorder, produced by Monitor Co, Modesto, Calif. uses a battery operated, quartz-controlled clock motor to move a small strip of chart recorder paper past a bimetallic, temperature responsive, scribe to produce a visual strip-chart containing a detailed record of the thermal profile of the unit.

Another type of device is the temperature alarm. An example of this later type of device is the TagAlert® monitor, produced by Sensitech Corporation, Beverly Mass. This is a small electronic device, with a microprocessor, temperature sensor, battery, and display all enclosed in a single case. The device can be factory customized to notify the user if the device has exceeded any one of 4 preset alarm conditions, such as temperature went too low, temperature went too high, total time spent at a pre-determined first temperature is too long, and/or total time spent at a pre-determined second temperature is too long. The device may be customized to respond to this narrow set of temperature alarm values, and pre-determined temperature-time alarm values.

The technology behind the TagAlert monitor was originally disclosed by Berrian et. al., U.S. Pat. No. 5,313,848; and subsequently reexamined and reissued as Re. 36,200.

In the broadest form, the device of Re 36,200 is a system, with an enclosed temperature sensor, which generates a time series of temperature measurements, stores some of the past temperature measurements, and uses some of these stored temperature measurements to generate an output signal. Re 36,200 differs from prior art electronic digital thermometers which also perform time series signal processing, and which also have digital memories of past readings, such as those taught by U.S. Pat. No. 4,536,851, in that the temperature sensor of Re 36,200 is enclosed in a housing, rather than on the surface of the housing or outside of the housing. In this respect, Re 36,200 has some aspects in common with electronic digital temperature controllers for portable medical instrumentation.

More specifically, however, the device of Re 36,200 may be viewed as a limited type of integrating time-temperature indicator, in that this device uses a sensor (isolated and protected from the external environment by a housing that also contains the other circuit components) to generate the time integral of temperature outside of an acceptable range, or above or below a predetermined threshold temperature, and store or otherwise make use of this value for output purposes. For example, the microprocessor may compute the time integral of temperature outside of an acceptable range, subtract this result from a preset reference value, test if the subtraction operation produces a number that is greater or less than zero, and use this test result to control system output.

Although the device of Re 36,200 teaches displaying a visual output means, the system has a number of drawbacks. In particular, the method is generally incapable of realistically modeling (or simulating) material thermal stability profiles, and thus is prone to generate inaccurate results.

Re 36,200 teaches a device that is essentially programmed by four parameters (the upper and lower acceptable temperature, the upper acceptable time value, and the lower acceptable time value). This method is very simplistic, however. The method assumes, for example, that no thermal changes occur between the upper and lower acceptable range conditions. Additionally, the method assumes that beyond the acceptable range limits, (at least up until an optional set of instantaneous temperature "stop" limits), all degradation occurs at the same rate regardless of temperature. As will be discussed in more detail later on, most materials have much more complex thermal degradation profiles, and are poorly monitored by such simplistic approaches.

Because of this lack of proper thermal modeling, for the purposes of this patent, the art of RE 36,200 will be designated as a "thermal alarm". This nomenclature is consistent with the unit's commercial designation (TagAlert®).

The prior art for time-temperature indicators thus may be separated into three main types. One type consists of visual indicators, which use chemical means to mimic the degradation characteristics of a material of interest. These visual indicators may be directly interrogated by unsophisticated users using no additional equipment, and impose no significant analytical burden on the recipient of the material of interest.

The second type consists of non-indicating electronic time-temperature monitors, and electronic data loggers. This second type also monitors the time and temperature by chemical or electronic means, but does not output the data in a manner that is readily accessible to unsophisticated users without additional equipment. Rather, this second class of electronic device requires specialized reading equipment, and may additionally require sophisticated data analysis on the part of the recipient of the material of interest.

The third type consists of electronic time-temperature alarms. This device, exemplified by the Sensitech TagAlert® monitor, does not attempt to integrate the progressive effects of time and temperature over all probable thermal histories, but rather simply informs the user in the event that a limited number (absolute low, time 1 at low 1 exceeded, time 2 at high 2 exceeded, absolute high) of predetermined time-temperature excursions have taken place. U.S. Pat. No. 6,320,512 teaches similar time-temperature alarm methods, using circuit methods similar to those taught by Texas Instruments (MSP430 family Software Users Guide, 1994, p 9–18 to 9–21; MSP430 Family, Metering Application Report, 1997, p 42–45) and others.

Such devices are useful for monitoring conditions during shipping, such as determining if shipment ice packs have melted, detecting if a shipping container has been exposed to temperatures over 50° C., or detecting other standard shipping faults, but are less useful for monitoring the individualized stability profiles of arbitrary materials.

The time-temperature devices of prior art thus have a number of significant drawbacks. They are either hard to read, inaccurate, or both. Most material recipients are not sophisticated in the details of the precise thermal time-temperature degradation profile of the materials they have just received. They do not want to perform complex analysis or use complex reading equipment. Rather, they simply want to immediately and accurately know if the materials are good or not.

The visual indicators of prior art, which are chemically mediated, give immediate visual results, but are not particularly accurate. These chemical indicators attempt to mimic the degradation characteristics of a material of interest by finding a different sensor material chemical with complementary degradation characteristics, such that observations of the change in the sensor material correspond to alterations in the material of interest. The drawback of this chemical approach, however, is that most materials of interest, such as biological materials, often may have unique and complex time-temperature profiles. In particular, some materials may have time-temperature degradation characteristics that differ profoundly from simple exponential (Arrhenius profile) degradation rates. By contrast, however, there are only a limited number of sensor chemicals that are suitable for visual time-temperature indicators. It is often difficult or impossible to find an exact match, over all temperatures, between the degradation rate of the sensor chemical, and the degradation rate of the material of interest.

As a result of these matching problems, the present practice is to be conservative. That is, chemical time-temperature indicators are usually set to degrade more quickly than the material of interest. Although this scenario will insure that the user does not inadvertently accept degraded material, it is inefficient. In many cases, material that is, in fact, still good may be inappropriately discarded due to poor time-temperature indicator accuracy. Of course, the alternative scenario, in which the chemical time-temperature indicator fails to adequately warn that the tracked material is degraded, is both unacceptable and potentially dangerous.

Radio-frequency based time-temperature indicators of the prior art, such as the previously mentioned device of Sjoholm et. al. (WO0125472A1), which contain chemical timers, have many of the same accuracy drawbacks as chemically based visual indicators.

By contrast, electronic data loggers have a different set of problems. Although these devices collect a full set of accurate time-temperature data, which may be used to determine if a material is acceptable or not, the data is in a difficult to interpret form. As previously discussed, many or most material recipients are unsophisticated, and are unlikely to have the equipment or specialized knowledge in order to read an electronic device, or to interpret a complex chart-recorder graphical output. As a result, many unsophisticated users, receiving material associated with an unreadable or hard-to-read electronic tag, are likely to ignore the tag altogether. As a result, users may inadvertently use material that has been degraded by an unacceptable thermal history.

The temperature alarms of the prior art, such as U.S. Re. 36,200, also are not ideal. These alarms can only be adjusted to trigger on a limited set of fixed unacceptable temperature for a fixed unacceptable time combinations. They are not well suited to accurately mimic the stability characteristics of arbitrarily selected materials. As a result, they have a tendency to either trigger too soon, or too late, which can result in either waste, or inadequate warning.

SUMMARY OF THE INVENTION

The present invention discloses an improved unitized electronic time-temperature indicator or monitor, which may have a simple visual output. This indicator may be easily and precisely customized to match the particular time-temperature decay (or curing) profile of an arbitrary material of interest. By means of this invention, the thermal degradation (or alteration) characteristics of an arbitrary material may be precisely characterized, and the results of this precise characterization almost instantly downloaded into a mass-produced, low-cost, generic time-temperature unit. This indicator unit may then be associated with the particular material that it is customized for, and used to monitor the material's subsequent thermal history.

After the material has been exposed to an unknown set of thermal environments for various durations, the fitness for use of the material may then be instantly assessed. Using the device and methods of the present invention, a user will need to only glance at the indicator. The display of the indicator will quickly and accurately show if the material is still acceptable or not, without subjecting the user to the burden of having to use extra analytical equipment or perform sophisticated data analysis. Additionally, the display may optionally disclose the approximate storage life remaining on the material, or optionally display the probable cause as to why the material has expired.

The device is "unitized" in that all components of the system are designed to comprise a single hand-held unit. Those devices with visual displays may operate without the need of any additional components, or external connections to other analytical or computational systems.

BRIEF DESCRIPTION OF THE DRAWINGS

1: Schematic diagram of an exemplary electronic circuit

2: Illustration of the basic algorithm used in the device

3: Flow chart showing a detail of the device's software.

4: Sketch of one configuration of the unit.

5: Sketch of an alternate configuration of the unit, incorporating a different type of display.

6: Illustration of a preferred display configuration

7: Sketch of an alternate configuration of the unit, incorporating an external temperature sensor.

Figure 8:
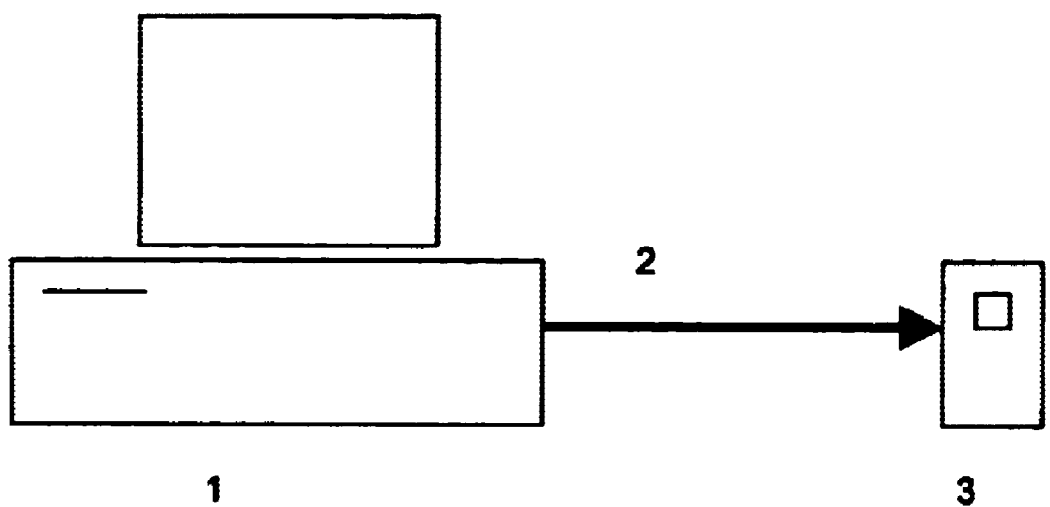

FIG. 8. Here, a programming device, such as a personal computer (1) transmits data over a programming cable (2) to a programmable electronic time-temperature indicator (3).

DETAILED DESCRIPTION OF THE INVENTION

Figure 1:
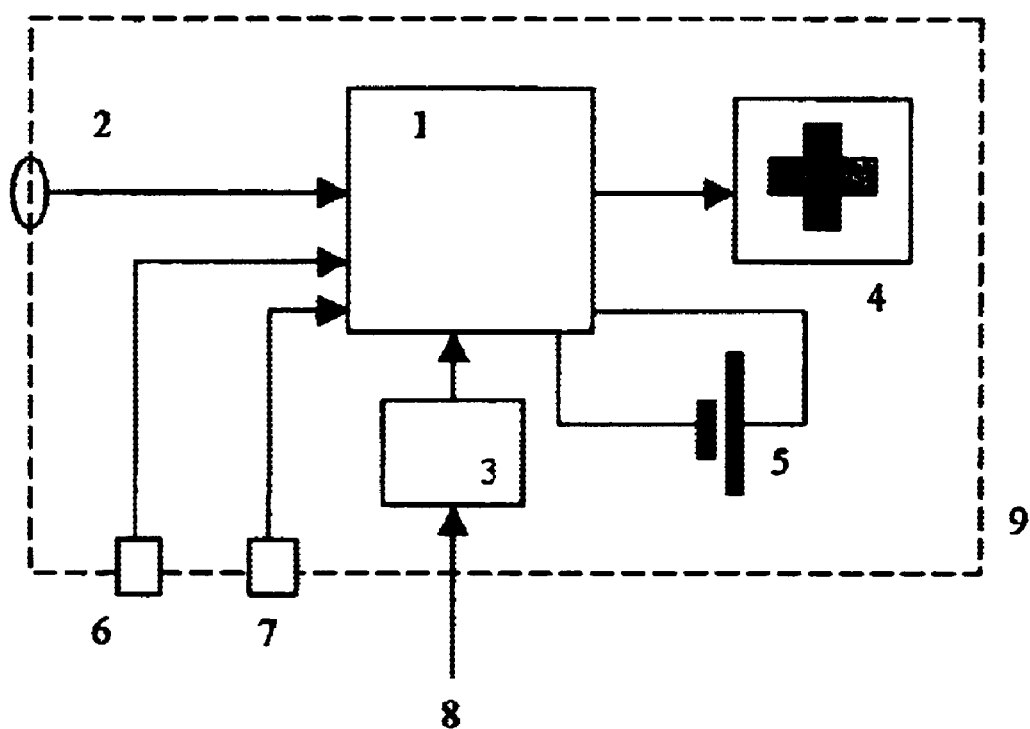

A schematic showing the electrical details of one embodiment of the present invention is shown in FIG. 1.

FIG. 1 shows a microprocessor or microcontroller (1) receiving thermal input data from a temperature sensor, such as a thermocouple or thermistor (2). The microprocessor (1) further receives algorithms from stability memory (3) containing instructions for converting the thermal data into numeric data proportional to the stability impact of the measured temperature upon the monitored material. Microprocessor (1) will typically contain an onboard timer, as well as other general programming information in its own onboard memory.

Microprocessor (1) will have at least one output means. Usually this output means will be a visual output means, such as a liquid crystal display ("LCD") (4). Other output means, such as LEDs, sonic alarms, vibration, radio frequency signals, electrical signals, and infrared signals may also be used. This output means, here exemplified by a liquid crystal display, will at a minimum be able to convey to the user the information that the stability characteristics of the unit have been determined to be acceptable (here designated by a "+" symbol), or non-acceptable (here designated by a "–" symbol).

Although other power sources are possible, microprocessor (1), and other power consuming circuitry in the unit, will typically be powered by battery (5). An example of such a battery is a 1.5 Volt or 3 Volt coin cell.

The microprocessor may optionally have user input means, such as a reset button (6) that zeros and reinitializes the unit. The microprocessor may also optionally have a second user input means, such as a test button (7), that sets the microprocessor to run in an accelerated time mode to facilitate quality control testing for the unit.

In order to make the time-temperature unit as versatile as possible, the processor memory containing the material stability data (3) is preferably designed to be a rewriteable memory, such as an electrically erasable programmed read only memory (EEPROM), or flash memory. This EEPROM or flash memory may be reprogrammed by signals from a programming device external to the unit (8). Alternatively, the stability data may be on a replaceable chip (such as a memory card chip), or other memory storage device, which is plugged into the unit.

It is generally convenient to place all the circuitry, including the battery, processor, thermistor (temperature sensor), buttons, and display into a unitized case (9), so as to present a single device or unit to the user. This device may optionally have attachment means, such as adhesive, Velcro, hooks, snaps, etc., to enable the device to be attached to those materials where a thermal history assessment is desired.

In an alternate configuration, where more precise monitoring of outside temperature is desired, the thermocouple or temperature sensor (2) may be embedded into the case wall, or mounted outside of the case. These later configurations may be preferred for situations where the monitor will be stuck directly onto the material to be monitored. In a fourth configuration, temperature sensor (2) may be mounted in the hole or junction between the case and the outside world, and be directly exposed to the outside world, gaining some physical protection while minimizing thermal interference from the case wall itself.

As previously discussed, to allow this device to be rapidly customized for a particular stability monitoring application, it is advantageous that the stability lookup table or conversion function data be stored in a non-volatile read-write storage medium, such as Electrically Erasable Programmable Memory (EEPROM), flash memory, or equivalent. However if this convenience is not desired, a non-reusable memory, such as a programmed read only memory (PROM), or read only memory (ROM) may also be used.

In some embodiments, the stability data stored in (3) may be in the form of a lookup table. In alternate embodiments, the data may not be stored in the form of a lookup table, but rather in the form of a mathematical function that automatically generates the equivalent information.

Microprocessors suitable for the present invention are typically ultra low power microprocessors, with a corresponding long battery life. These microprocessors may additionally incorporate a number of onboard functions such as timers, liquid crystal display drivers, analog to digital converters, and circuitry to drive temperature sensors. The MSP430 family of microprocessors, such as the MSP430F412, produced by Texas Instruments, Inc., exemplifies one such microprocessor type. This processor family includes members with onboard reprogrammable flash memory, as well as analog to digital ("A/D") converters, timers, LCD drivers, reference current sources to power sensors, and other functions. Here, the stability data may be directly downloaded into the flash memory on the same chip that holds the other processor components.

An alternative processor family, suitable for the present invention, is the OKI semiconductor nX 64 K family of microprocessors, such as the MSM64167E processor.

This is an ultra low power processor with built in A/D converters, an LCD driver, a timer, and reference current sources to power sensors. It has 4064 bytes of onboard one-time programmable memory, and an ability to address external EEPROM memory (where lookup table data may be stored) through it's built in serial port. Here, the stability data may be downloaded into an EEPROM memory chip that is separate from the other processor components.

Other processor families are also suitable. It is not necessary that the processor chosen be low current, nor is it necessary that the processor have integrated peripherals (LCD driver, timers, reference current sources, etc.). However such characteristics are desirable as they reduce the complexity and expense of the monitor.

Time-Temperature Monitoring Algorithm:

One of the key aspects of the time-temperature monitor disclosed herein is the software algorithm. Unlike previous temperature loggers, which simply accumulate a record of time and temperature data, and store this record in memory without any attempt to interpret the data, the time-temperature monitor of the present invention continually interprets the data and makes "fitness for use" judgments based upon it. Unlike previous temperature alarm algorithms, such as those taught by U.S. RE 36,200; the time-temperature monitor of the present algorithm continually monitors the impact of stability degradation occurring at all temperature levels (i.e. all temperatures within the measuring range of the instrument), rather than simply monitoring the stability impact of a few preset temperature levels.

Figure 2:
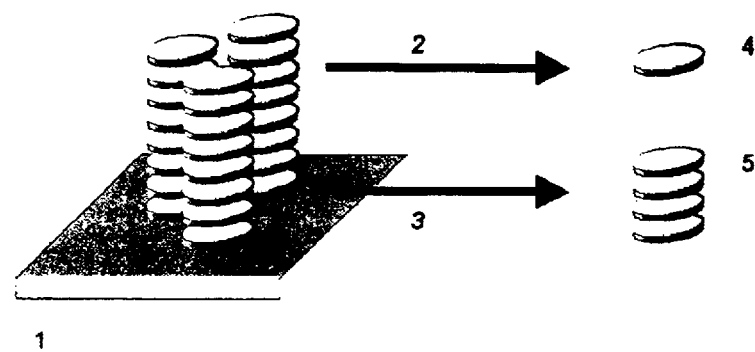
Figure 2:
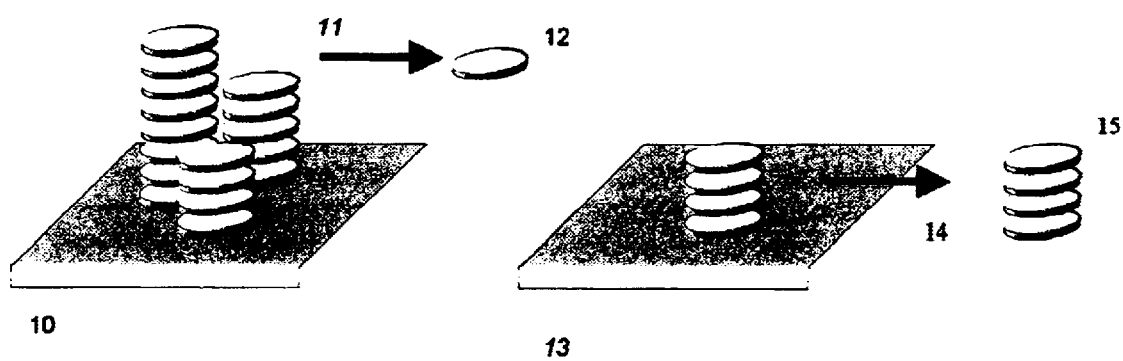

The present invention employs a "stability bank" concept for tracking stability, which is illustrated in FIG. 2.

Here, a material's stability is tracked by the status of a stability bank account (B), shown in (1). This account is opened (for fresh material) with an initial deposit of "F" stability points. At regular time intervals, "P" stability points are withdrawn from the account. The number of stability points "P" that is withdrawn for each unit of time is a variable that is a function of both temperature, and the length of the time between successive measurements "Δ time". This function, designated P(temp, Δ time), will normally return values throughout the entire temperature measuring range of the instrument, or at least as much of the temperature measuring range as relevant to adequately monitor the thermal stability of the material in question.

Because the Δ time value is typically constant for any given time periodicity, for the purposes of this discussion, the stability function P(temp, Δ time) will be abbreviated as simply P(temp).

P(temp) can be any function that adequately monitors the material in question. Since materials usually deteriorate more rapidly at lower temperatures than higher temperatures, P(temp) will often be a function that has a lower value at lower temperatures, and a higher value at higher temperatures. Some materials, however, such as materials susceptible to damage by freezing, have alternate stability profiles in which lower temperatures cause more deterioration than higher temperatures. In this situation, P(temp) may be a function that is higher at lower temperatures. Still other materials may be damaged at both low and high temperatures, and exhibit a "U" shaped P(temp) curve, or more complex curve. For simplicity, FIG. 2 shows the most common case where P(temp) is low at low temperatures, and high at high temperatures.

In this example, at low temperatures (2), a small number of stability points "P" are withdrawn from the bank every unit of time, Δ time (4). At higher temperatures (3), a larger number of stability points "P" are withdrawn from the bank every unit of time, Δ time (5).

As the material ages, the amount of stability points remaining in the stability bank (B) decreases. When the stability bank account "B" hits zero, the material has expired.

Mathematically, if the stability bank account "B" of the fresh material is "F", and P(temp) stability points are withdrawn continually, then the status of the stability bank account "B" at any time point is the integral of P(temp) over time, or:

$$B = F - \int_0^{time} P(temp) dt \quad \text{(Equation 1)}$$

In practice, the P(temp) value is usually produced by microprocessor algorithm that relies upon digital measurements from a temperature sensor. As a result, P(temp) usually is a step function with some granularity, such that P(temp) may produce the same results for each degree or tenth of degree of temperature. That is, for example, P(25° C.)<>P(26° C.), but P(25.02° C.)=P(25.03)° C.

Also, in practice, the successive temperature measurements are not taken infinitely close together in time, but also have some time granularity. Typically, P(temp) determinations are taken at periodic time intervals, with a typical frequency of between 1–60 minutes depending upon the application and power consumption considerations. As a result, the integral of P(temp) over time is numerically approximated by a summation function, where each element of the summation function represents the P(temp) from a different sequential time point.

Thus, for example, if time readings are taken every minute, the status of the stability bank account "B" at "Time" (or "T") minutes later is:

$$B = F - \sum_0^{Time} P(temp) \quad \text{(Equation 2)}$$

The value of "F" is chosen from experimental or theoretical studies of the material of interest so as to generate a B>0 value when the material is still good, and a B<=0 value when the material has expired, or otherwise reached an important change in state that should be communicated to the user.

Using the stability bank model, and appropriate selection of "F" and P(temp) values, the stability characteristics of nearly any material can be accurately modeled.

As FIG. 2 shows, as time progresses, and multiple stability unit withdrawals are made, the stability bank becomes depleted. In this example, where P(temp) is lower at low temperatures (10), since the rate of withdrawal is less (11), (12), the bank will retain a positive number of stability units for a longer time. However at higher temperatures (13), where the rate of withdrawal is higher (14), (15), the bank is depleted sooner.

As previously discussed, the stability of many different types of materials can be accurately modeled by careful selection of the P(temp) function or lookup table. For example, enzymes or other materials that are damaged by both low (freezing) and high temperatures may best be modeled by a "U" shaped P(temp) function that generates a high number of stability units at both low and high temperatures, but a relatively low number of stability units at intermediate temperatures.

To obtain accurate results for most materials, the P(temp) function or lookup table should operate throughout the relevant temperature measuring range of the unit, and have a temperature granularity (ability to discriminate and generate different values for) of at least 10° C. or smaller, and preferably 1° C. or smaller. The time granularity, Δ time, of the successive P(temp) measurements should be at least 1 hour or less, and should preferably be on the order of minutes or seconds.

Figure 3:
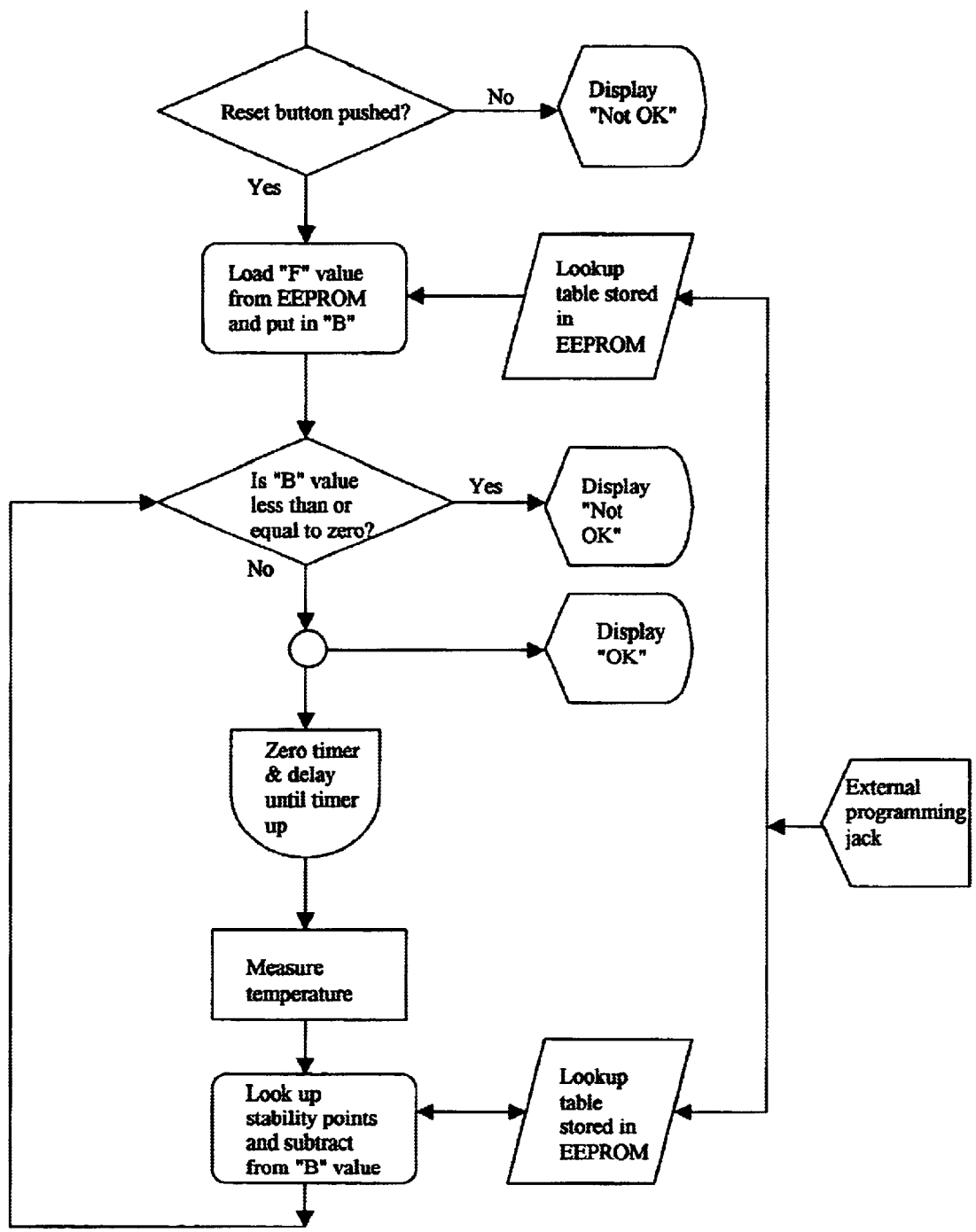

FIG. 3 shows a detail of the software algorithms of the present invention, which implement the stability bank model shown in FIG. 2.

In this example, the device has a reset button that resets the thermal history of the device to a "fresh" state upon initial power up. As a safety precaution, however, upon initial power up, the device initially displays "Not OK" until the reset button has been depressed. This helps protect against accidental losses of power.

Upon initialization, the device retrieves the full stability index number corresponding to fresh material, "F" from its stability data memory, and loads it into the running thermal history bank account "B" register. In this example, the stability initialization memory is of a reprogrammable type, such as EEPROM or flash memory. To enable the device to be rapidly configured to handle a variety of different material stability and thermal history types, this reprogrammable memory may be reprogrammed through a data input jack, which is normally accessible on the device's external surface. Alternatively, the device may be reprogrammed by radio frequency signals, infrared signals, or other modality.

In this embodiment, the device then enters an infinite loop, which can only be terminated by pressing the reset switch. Normally, upon initialization, a positive fresh "F" value will have been stored in the "B" register, and the device will indicate an "OK" message. In this infinite loop, the device continually checks the status of the running total thermal history in the "B" register, and updates it's display to show "Not OK" in the event that the value in the "B" register falls to zero or below zero.

In the next step in the infinite loop, the device will then activate an internal timer, and wait a fixed amount of time. The exact delay will depend upon the material characteristics desired to be modeled. For most applications, the timer will be set to delay for around 1–60 minutes, however this time may vary considerably depending upon the specific application. It may vary from hours on the high end, to minutes, seconds, or even fractions of seconds on the low end.

After the delay time is up, the device will then measure the ambient temperature by querying its temperature sensor, and calculating the ambient temperature. The device will then consult a P(temp) lookup table, or conversion algorithm, to determine how much material degradation ("stability point loss") would be caused by exposure to the measured temperature during the loop-delay-timer time interval. As before, this lookup table or conversion algorithm is preferably stored in a rewriteable memory, such as EEPROM or flash memory, that can be easily be reprogrammed in order to enable the device to be rapidly configured to monitor a large number of different products.

This thermal degradation or "stability debt" number is then subtracted from the "thermal savings account" stored in the "B" register. The device then repeats the infinite loop.

In the event that the thermal savings account stored in the "B" register falls below zero, then the device will immediately detect this during the "B" register value check at the beginning of the infinite loop, and will display "Not OK". Alternatively, if the device is intended to monitor an incubation or curing process, the prompts may be reversed, and the device will display a "Not OK" message until a minimal thermal history has accumulated, at which point it will then display an "OK" message.

Elaborations on this basic scheme are also possible, and often desirable. For example, while the material is still "good", it may be desirable to generate the ratio between the remaining stability number "B", and the original fresh stability number "F", and show the "B/F" ratio on a bar chart. This way, users can see the continual degradation of stability, and will have some warning in advance that the material is about to go bad. Alternatively, users may view the progression of an incubation or curing process.

In other situations, users may come across apparently prematurely expired units, and be curious as to what triggered the premature expiration. To help address these issues, the unit may also be programmed to display a "potential cause of expiration message". One simple way to do this is, upon stability expiration, to have the unit display a "high temperature" symbol if the temperature at the time of stability expiration was unusually high, and/or to display a "low temperature" symbol if the temperature at the time of stability expiration was unusually low. This way, for example, if a shipment of material arrives in an expired state with a "high temperature" symbol displayed, then the possibility of high transit or storage temperatures would be suggested.

Programmability: It should be evident that the particular advantages of the present invention, that of more accurately and realistically simulating the stability characteristics of a given material of interest, usually will require significantly more data than the limited number of fixed time-fixed temperature alarm devices of prior art. In order to maximize the benefits to the manufacturer and user, in a preferred embodiment of the present invention, the finished device is programmable or reprogramable, enabling complex P(temp) functions or relatively large P(temp) lookup tables to be downloaded into the unit.

In a preferred embodiment, the present invention will contain means to enable automated programming and reprogramming of the device, as well as means, such as checksum verification, etc., to ensure that the P(temp) data has been properly entered. Such means include replaceable memory chips, electronic data transfer, infrared data transfer, and radio-frequency data transfer.

Time delays: Often, it may be desirable to incorporate a software time-delay into the unit so that factory workers may initialize the unit, pack the unit with the material of interest, and transport the finished package to a transportation dock, without concern that the electronic time-temperature unit is operating prematurely. To accomplish this, the device software may be configured to enter into a simple time-delay loop between unit initialization, and commencement of stability monitoring activity.

Security: Once a time-temperature indicator has been initialized, it is often important to incorporate security measures in it so as to prevent, discourage, or discover subsequent tampering with the unit. Here, software security methods may be employed that allow factory workers a limited amount of time to reset the unit in the factory, but then prevent users from resetting the unit to a "fresh state" in the field by intercepting any reset command, and locking out subsequent changes to the unit's status. Alternatively, hardware security measures, such as tamper evident security stickers that block access to reset buttons, etc., may also be used.

Unitized Device Configuration:

Typically, the unitized electronic time-temperature indicator device of the present invention will operate as a stand-alone unit, often placed in a shipment container, or affixed to a material of interest, such as an intra venous bag containing a perishable drug, by an adhesive or other type of attachment.

Figure 4:
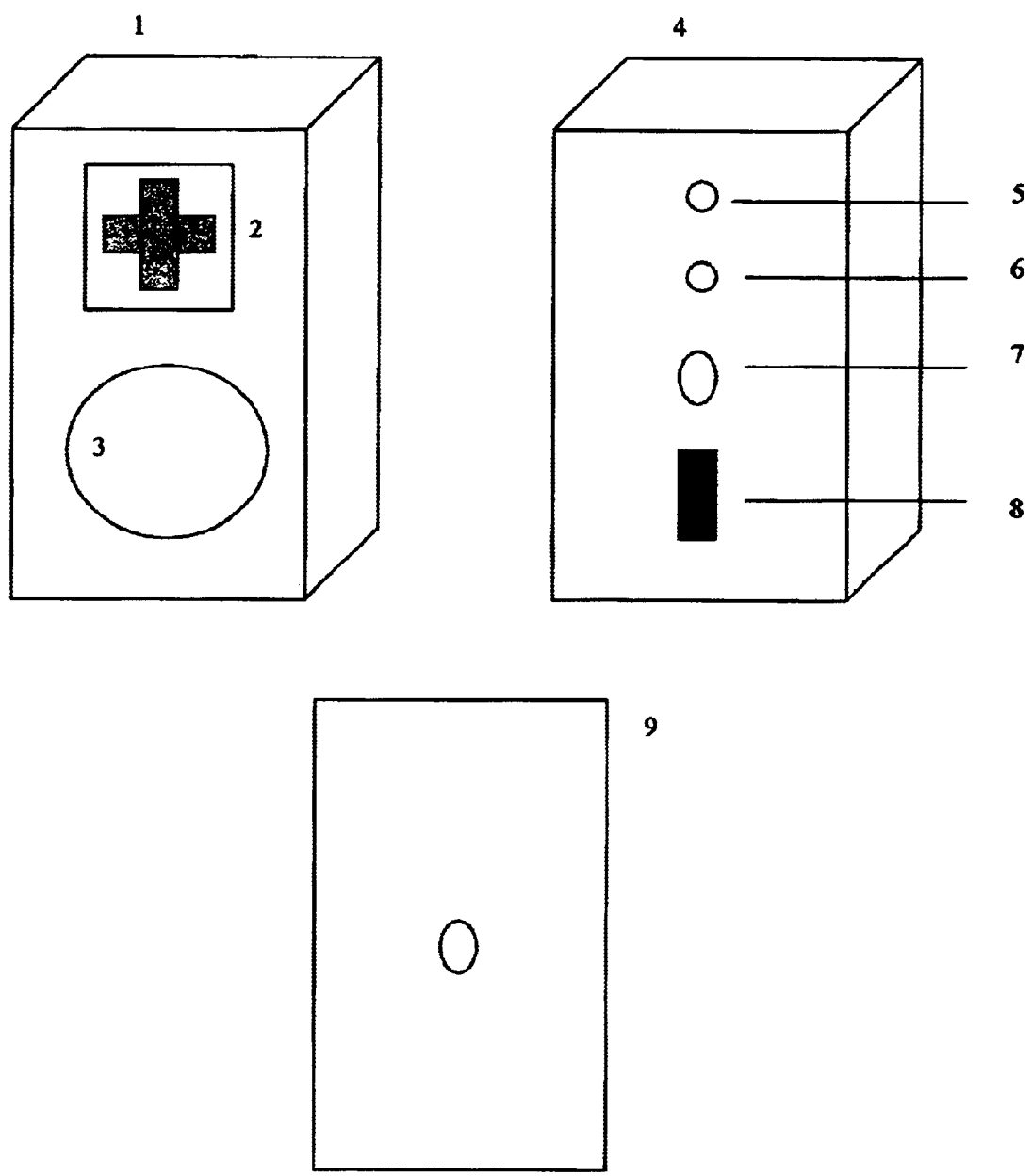

FIG. 4 shows an example of one such stand-alone configuration. Here, the circuitry is enclosed in case (1) which has a liquid crystal display (2) that displays a "+" symbol if the thermal history of the unit is acceptable (shown), or a "−" if the thermal history is not acceptable (not shown). The unit additionally contains a removable lid (3) that holds a coin cell battery (not shown). The back of the unit, shown in (4) additionally has a "reset" button (5), which can be used to reset the thermal history of the unit back to a "fresh" state. This enables the unit to be properly initialized (thermal history set to zero) upon first use of the unit, and potentially also enable the unit to reused. The unit may also have a "test" button (6), that enables the unit to perform P(temp) determinations at an accelerated speed (typically 60–100× normal the normal rate). This "test" button enables the unit to be rapidly tested for quality assurance purposes.

In this configuration, the unit's temperature sensor is exposed to the outside environment through a sensor mounted on the case surface (7). This exposes the sensor to the outside temperature, while keeping the overall surface of the unit flat. This configuration allows for good temperature equilibration between the sensor and the outside environment, while minimizing the chance of damage to the sensor, and making it easy to use adhesive to press the entire surface of the unit against a flat surface on the material of interest.

The unit's data input jack (8) enables stability data to be programmed into the finished unit. This input jack allows general-purpose units to be easily and rapidly customized for many different products and uses.

To prevent tampering with the device after initialization, a tough adhesive security seal (9), which may contain a hole in it to for the temperature sensor, may be applied to the back of the unit (4) to discourage users from resetting the device.

Figure 5:
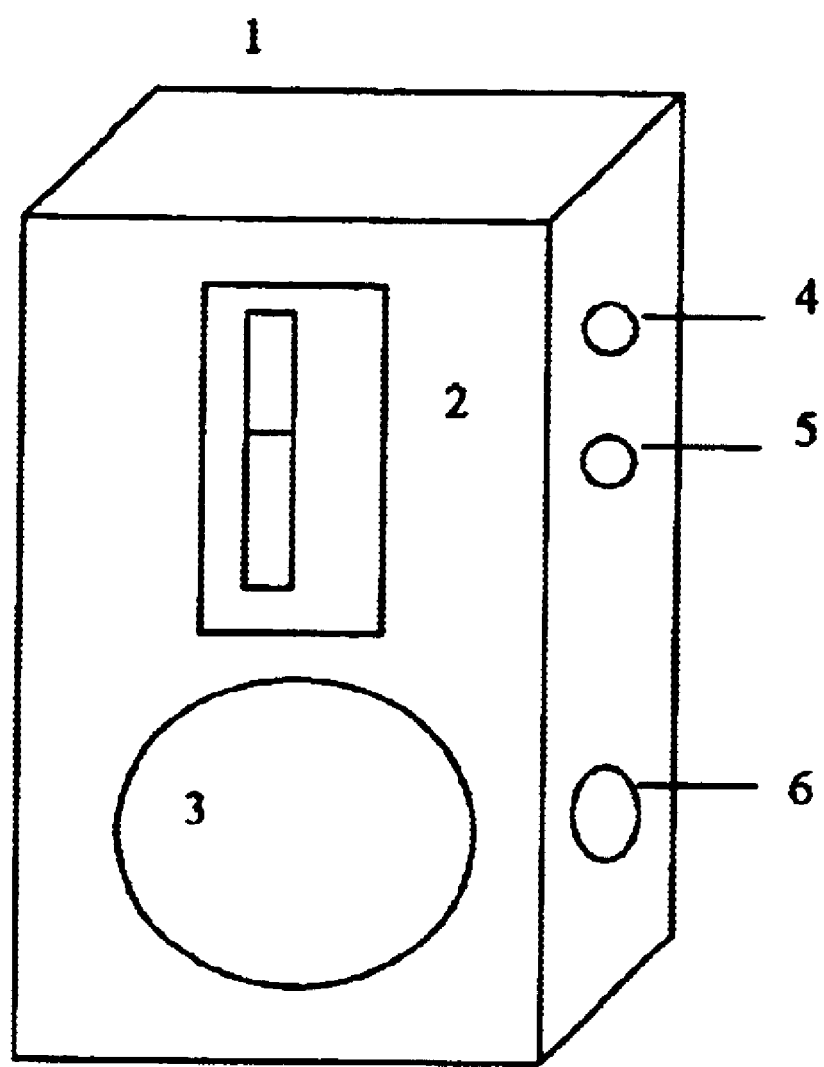

FIG. 5 shows an alternate stand-alone configuration. As in FIG. 4, this unit, enclosed in case (1) has a liquid crystal display (2). Here, the display differs from FIG. 4 in that instead of simply displaying a binary OK (+)/Not OK (−) symbol, the display shows a "remaining life" bar. This bar may be generated by computing what percentage of the initial fresh stability value "F" now remains in the device. For example, the height of the bar can be displayed to be proportional to the B/F ratio, where B represents the amount of stability units remaining in the device's "stability bank", and F represents the potential number of stability units in the bank when the material is fresh.

As for FIG. 4, this unit additionally contains a removable lid (3) that holds a coin cell battery (not shown). The unit additionally has a "reset" button (4) (here mounted on the side of the unit), which can be used to reset the thermal history of the unit back to zero. This enables the unit to be properly initialized (thermal history set to zero) upon initial use of the unit, and also enable the unit to reused if desired. The unit also has a "test" button (5), which enables the unit to run faster than normal, and a data input jack (6).

Note that instead of a graphical "bar", the unit might alternatively display a pie chart, a numeric percentage value showing percentage lifetime expended or remaining, a number estimating the number of lifetime days remaining if the material is kept at a constant temperature (such as room temperature or refrigeration temperature), or other type of lifetime used or lifetime remaining message.

Figure 6:
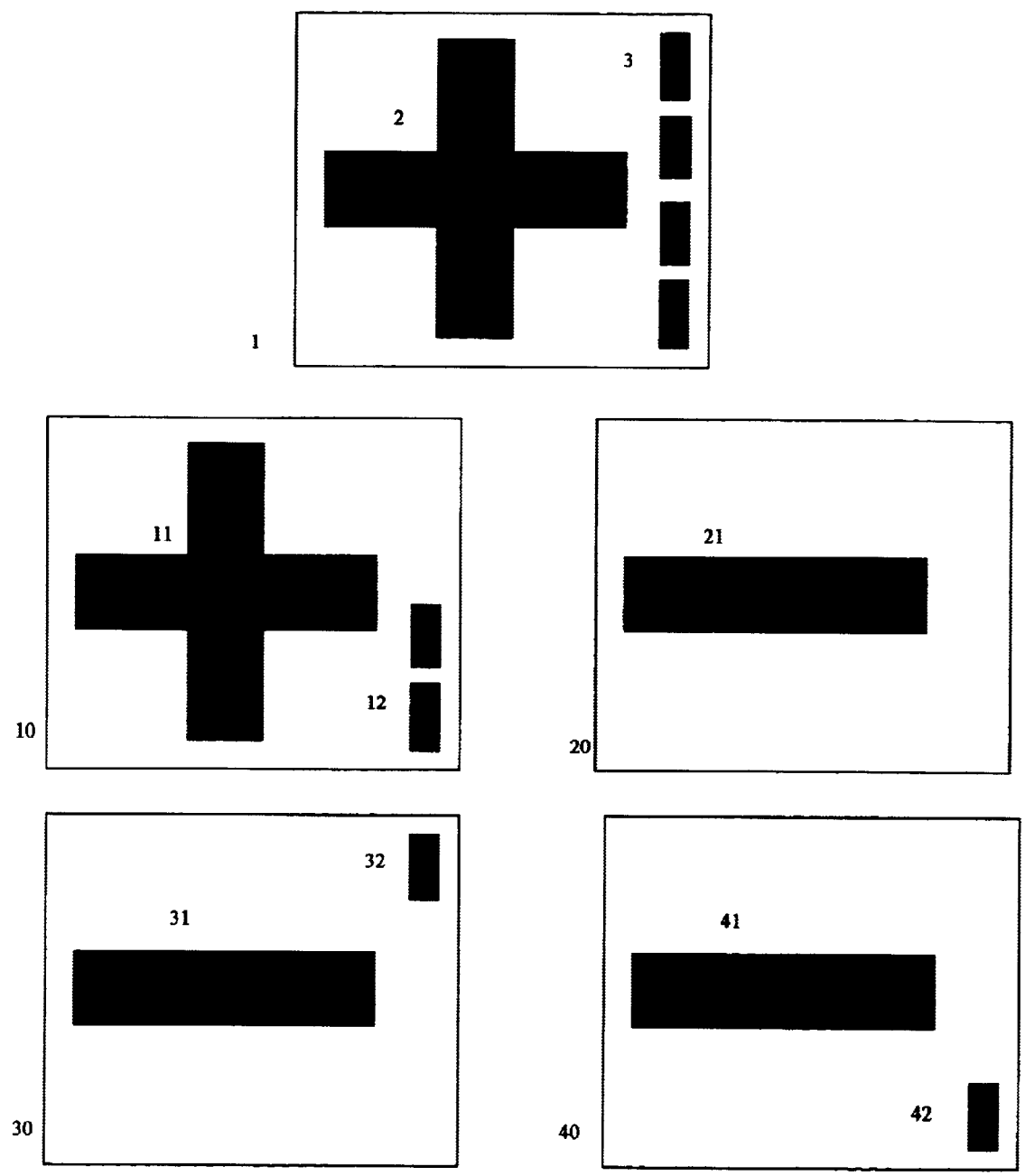

FIG. 6 shows a close up of the display (1) of a preferred embodiment of the present invention, incorporating both a large "+", "−" good/not good indicator (2) that can be clearly seen from a distance, as well as a smaller multi-element "lifetime bar" (3). In the fresh configuration, the device will normally resemble (1), showing both a "+" (good) message (2), as well as a full lifetime bar (3).

As the thermal history of the device progresses, the stability of the material can be tracked as shown on (10). The stability bar (12) will show a decrease in storage lifetime, but while the storage lifetime is still positive, the good/not good indicator (11) will continue to show a "+" (good).

Once the product has reached the end of its stability life (20), the good/not good indicator (21) will typically change to a not-good configuration (21). This display might be used if, for example, the material had reached the end of its shelf life while being exposed to a generally acceptable thermal environment.

In some cases, it may be desirable to also indicate the probable cause of end of stability life. This is shown in (30). Here, the good/not good indicator (31) shows a "−" (not good). Additionally, one of the higher stability bar elements (32) is shown turned on. This might occur if, for example, the device was recording a high temperature at the time that the stability lifetime had reached zero. Alternatively, as is shown in (40), if the device was recording a low temperature at the time that the stability lifetime had reached zero, the good/not good indicator (41) would again show a "−" (not good), and one of the lower stability bar elements (42) would be turned on.

Figure 7:
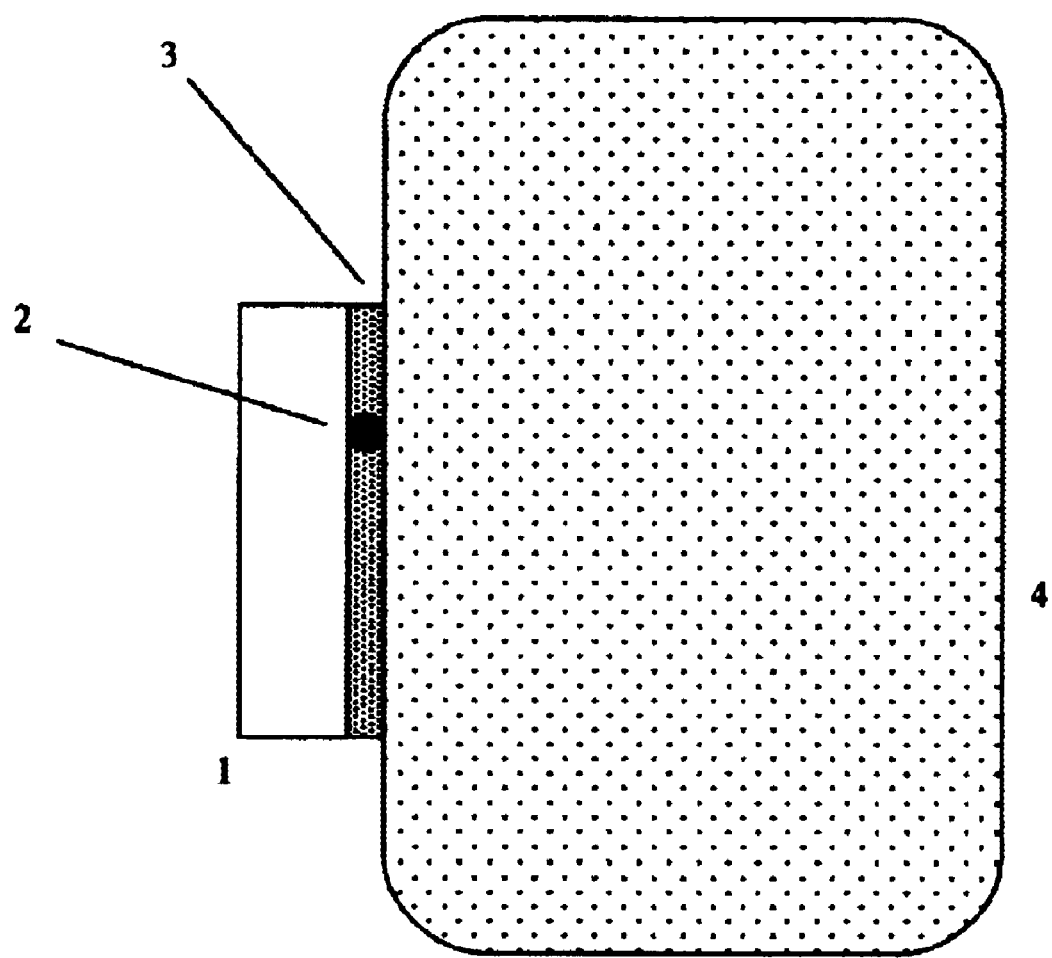

FIG. 7 shows a third configuration, useful for monitoring the temperature of a flexible intravenous (iv) bag containing blood, platelets, chemotherapy, antibiotics, or other perishable material, as well as many other applications. Here, the temperature sensor (2) is mounted slightly outside the main unit case (1), and is mounted flush to the rear (non display) side of the unit's case. The rear of the case may also contain an adhesive (3), such that the tag can be affixed to a flexible bag (4) containing a fluid; or other material of interest. In this configuration, the temperature sensor is capable of more accurately monitoring the temperature of the test material.

Although stand-alone operation is highly useful, in an alternative embodiment, the device may be incorporated into a second device with an alternative but complementary purpose.

In one configuration, a time-temperature monitor operating according to the principles disclosed herein may be incorporated into a pump that pumps perishable liquids. One example would be an insulin pump, intended to be worn for prolonged periods by diabetics. A second example would be an intravenous medication pump.

In still other cases, the device may be designed to operate as a plug-in card or module, so that it may be affixed to a perishable material, such as an IV bag of drugs, for transport from a pharmacy to a patient. Upon arrival at a patient station, such as an IV pump, the time-temperature card may then be plugged into or otherwise interfaced with the IV pump, so that the microprocessor or microcontroller controlling the IV pump may become aware of the thermal history of the drug that it is pumping.

Although it is contemplated that most units of the present invention will have a visual interface, this need not be the only interface that the device is capable of presenting. In an alternate configuration of the invention, the device may also indicate an acceptable or unacceptable thermal history by an alternate communication means. This alternate communication means may be by sound (sonic alarm or signal), electrical signal, infrared signal, radio-frequency signal, or other communication modality. Examples of radio frequency signals may be 2.4 GHz Bluetooth® wireless signals, and the like. In some cases, the thermal monitor may be hooked up to the Internet, and communicate its status via standard Internet protocols.

Although, in many situations, the unit's sensor will be a temperature sensor, other situations where the time history of a measured value must be determined for acceptability or non-acceptability may also be assessed by the methods disclosed herein. For example, in alternate configurations, the sensor may be a humidity sensor, and various combinations of humidity and time may be monitored. In general, any sensor monitoring any type of detectable signal, wherein the signal pertains to an environmental condition that may impact the functional properties of the material, may be used.

Programming the device: After the "F" and P(temp) data have been calculated, the process of producing a customized device is relatively simple. The "F" value and table of P(temp) values are downloaded electronically into the device through the unit's data input jack, or manually through memory chip placement. The programmed device is then ready to use.

To do this, the table of P(temp) values will typically be entered into a data download program, which may run on a standard personal computer (PC), or other programming system. The device is then connected to the PC's data transfer port (such as a serial or USB port) via an adapter cable, and the data transferred. After the data is downloaded, the program and microprocessor on the device itself may automatically check the success of the download by comparing the data to a checksum. A schematic of this download process is shown in FIG. 8. Here, a programming device, such as a personal computer (1) transmits data over a programming cable (2) to a programmable electronic time-temperature indicator (3).

Before use, the programmed units will usually be subjected to additional quality control (QC) testing and verification. Here' the unit's ability to operate in an optional high-speed "test" mode, as well as an optional ability to report temperature sensor calibration by telemetry, may be useful.

After programming and appropriate QC verification, a QC security sticker (containing appropriate labeling) may be placed over the unit's test button, data port, and reset button to keep unauthorized users from tampering with the unit. Alternatively, software parameters may be set to prevent subsequent program alteration by unauthorized users.

To facilitate use in the manufacturing environment, the device can be programmed with a variable "start of testing delay" value between 0 and 1440 minutes (1 day). This allows the manufacturer time to initialize, handle, and package the unit before monitoring begins.

EXAMPLE 1

Insulin Time Temperature Monitor

In order to properly configure the device, the stability of the material of interest should first be characterized. To do this, quantitative "maximum acceptable deterioration" criteria, should be established, and used to determine the material's stability lifetime when the material is stored at a variety of different temperatures. The stability lifetime at the various experimental temperature levels is then determined, and used as input into the stability programming calculations.

Using the experimental data, a curve or equation is then generated that fits the observed data. This curve is used to calculate the stability lifetime at intermediate temperatures.

As an example, consider a commonly used injectable drug, insulin. Insulin is commonly carried by traveling diabetics, but will deteriorate if exposed to excessive levels of temperature for too long. The work of Brange et. al. 'Galenics of Insulin' [Novo Research Institute, Denmark] Springer-Verlag, 1987; determined that a particular type of insulin, called "ultralente insulin", has the following stability characteristics:

TABLE 1

Experimental Insulin stability data
Insulin stability at various temperatures (° C.)

| Insulin type | 4° C. | 15° C. | 25° C. | 40° C. |
|---|---|---|---|---|
| Ultralente | 19 years | 2 years | 4 months | 1 week |

Note that at the point of maximum stability (4° C.), the insulin has a fresh lifetime "F" of 19 years, or 165984 hours. Thus, in this example, using hours for the time units to simplify the calculations:

F=number of time units at optimum stability temperature= 165984 hours.

So the stability bank "B" for fresh material will have an initial deposit of "F" (165984) units. Moreover, if the insulin is kept at a constant 4° C. temperature, $P(temp_{4C})$ should deduct 1 point per hour from the stability bank "B", and the stability equation (2) is:

$$B = F - \sum_{0}^{Time} P(temp_{4c}) \text{ thus:} \quad \text{(Equation 3)}$$

$$B = 165984 - \sum_{0}^{Time} 1 \text{ or equivalently:}$$

$$B = 165984 - Time$$

To determine the P(temp) values for temperatures above 4° C., the experimental stability lifetime data is modeled by a best-fit equation. The nature of this equation will vary according to the specific material being modeled. In this example, the data from table 1 was converted into an "hours of lifetime" format, and analyzed using a Microsoft Excel spreadsheet program. Excel showed that the 4° C. to 40° C. insulin data fit the following exponential equation quite well:

$$\text{Stability\_lifetime(hours)} = 0.77 e^{0.1752T} \quad \text{(Equation 4)}$$

where "T" is the time in hours

To determine the P(temp) values for various temperatures, it is important to note that at a constant temperature, tempo, equation (2) becomes:

$$B = F - P(temp_c)T \quad \text{(Equation 5)}$$

Now by definition, the stability lifetime is the time "T" when the stability bank "B" first hits zero, so at the stability lifetime limit where B=0, equation (5) becomes:

$$0 = F - P(temp_c)T \quad \text{(Equation 6)}$$

so solving for $P(temp_c)$, then $$P(temp_c) = \frac{F}{T} \quad \text{(Equation 7)}$$

Thus for any given temperature, $P(temp_c)$ is equivalent to the lifetime of the material "F" at the optimal stability temperature, divided by the calculated lifetime of the material at the particular given temperature ($temp_c$).

In this insulin stability example; the experimental data from table 1, the maximum stability lifetime "F" of 165984, and the best fit stability lifetime equation (4), can be combined with equation (7) to produce a table of P(temp) values, with a temperature granularity of 1° C., that covers the full temperature range between the lowest and highest experimental data points.

In order to insure the safety of the time-temperature monitor, it is important that both the low and high temperature boundary conditions are properly addressed. In this example, ultralente insulin is known to be damaged by freezing. Thus P(temp) values<=0° C. are assigned a very high point value. This way, the time-temperature monitor will quickly show that the product is unusable upon the detection of freezing conditions. Similarly, at very high temperatures, insulin is inactivated with accelerated kinetics. Since, in this case, the available data do not extend above 40° C., the time-temperature P(temp) values for above 40° C. have also been assigned a very high point value. This way, the time-temperature monitor will rapidly show that the product is unusable upon the detection of temperature values beyond the range of the data available.

In practice, it is advisable to collect data over as broad an experimental range as possible, so as to insure the fidelity and robustness of the time-temperature indicator over both expected and unexpected temperature ranges.

These boundary considerations are combined with the experimental data of Brange et. al. to produce a table of P(temp) values, which are shown in table 2 below:

TABLE 2

P(temp) calculations for Insulin stability between −20 to 70° C.

| Temp ° C. | Lifetime Hours | P(temp) | Notes |
|---|---|---|---|
| −20 | 1 | 165983 | Low boundary |
|  |  |  | Low boundary |
| −1 | 1 | 165982 | Low boundary |
| 0 | 165984 | 165981 | Low boundary |
| 1 | 165984 | 1 |  |
| 2 | 165984 | 1 |  |
| 3 | 165984 | 1 |  |
| 4 | 165984 | 1 | Data point |
| 5 | 82992 | 2 |  |
| 6 | 82992 | 2 |  |
| 13 | 20748 | 8 |  |
| 14 | 18443 | 9 |  |
| 15 | 17472 | 9.5 | Data point |
| 16 | 12768 | 13 |  |
| 17 | 11066 | 15 |  |
| 21 | 5354 | 31 |  |
| 22 | 4611 | 36 |  |
| 23 | 3860 | 43 |  |
| 24 | 3192 | 52 |  |
| 25 | 2912 | 57 | Data point |
| 26 | 2274 | 73 |  |
| 38 | 277 | 600 |  |
| 39 | 232 | 714 |  |
| 40 | 168 | 988 | Data point |
| 41 | 1 | 165981 | High boundary |
|  |  |  | High boundary |
| 70 | 1 | 165983 | High boundary |

To keep the table a manageable size, suitable for printing, the temperature entries between −1 to −20, 6 to 13, 17 to 21, 26 to 38, and 41 to 70° C. are not shown.

Although in this example, the P(temp) table is calculated assuming a time granularity of 1 hour, for typical applications, temperature data and P(temp) calculations will typically be performed every few minutes.

Using this scheme, a standard device may be customized to monitor materials with stabilities ranging between the stability of ice cream, and the stability of rocks.

To illustrate how the methods of the present invention function, and compare with the methods of prior art (such as RE 36,200), consider the insulin monitor of example 1 operating under: a: constant temperature conditions, b: variable temperature conditions, and c: extreme temperature conditions.

For constant temperature conditions "a", assume that the time-temperature monitor is stored at a constant temperature of 25° C. Then from table 2 above, the stability lifetime would be up when the stability bank value, B, is 0. Thus:

$$B = 0 = 165984 - 57 \text{ (lifetime in hours)}. \quad \text{(Equation 8)}$$

(lifetime in hours)=165984/57
lifetime in hours=2912 hours
lifetime in months=4 months.

This reproduces Brange's experimental data from table 1, which is the correct and expected result.

In the real world, of course, temperatures are not constant. For variable temperature situation "b", consider a monitor that is exposed to a simplified periodic oscillating temperature swing of 12 hours at 25° C., and 12 hours at 17° C. This roughly corresponds to a temperate climate day-night temperature cycle. In this case, what would the lifetime, "L" of the insulin, as calculated by the monitor, be? Here, the time temperature monitor would record:

$$B = 0 = 165984 - (57(L/2) + 15(L/2)) \quad \text{(Equation 9)}$$

L=165984/36
L=4610 hours
L=6.4 months.

Here, the utility of the present invention becomes apparent. It is normal practice to rate the stability of non-refrigerated products as the product's lifetime at a constant 25° C. room temperature. Without the time-temperature monitor of the present invention, the unrefrigerated ultralente insulin would thus be considered "bad" at four months, resulting in a significant amount of waste. Here the improved time-temperature monitor shows that the insulin is still good, and helps to prevent waste.

Note the differences between the techniques of this art, and the techniques of prior art, such as Re. 36,200. Using the methods of prior art, it is essentially impossible to accurately model the extension or loss of product lifetime due to thermal cycling effects. This is because the methods of Re. 36,200 would, at best, teach a first alarm to trigger after a cumulative total of 11,066 hours at 17° C., and a second alarm to trigger after a cumulative total of 2,912 hours at 25° C., but neither alarm would accurately predict the true stability (4610 hours) obtained in the temperature cycling example shown above. Even the use of a third fixed-temperature fixed-time alarm, at an intermediate time point, such as 4611 hours at 22° C., will not work, because in this example, the insulin has not been exposed to temperatures between 17° C. and 25° C. for an appreciable length of time. Thus none of the fixed alarm settings will accurately trigger in this situation. This is shown in more detail in table 3 below:

TABLE 3

Comparison between the methods of this disclosure, and prior art

| Real Time (hours) | Temp. | P(temp) per hour | Sum of: P(temp)s | Prior art: preset time method, alarm setting |
|---|---|---|---|---|
| 2305 | 17° C. | 15 | 34,575 | 11,066 hours |
| 0 hours | 22° C. | 36 | 0 | 4611 hours |
| 2305 | 25° C. | 57 | 131385 | 2912 hours |
|  | Cumulative total: |  | 165984 | N/A |
|  | Reference value: |  | 165984 | N/A |
|  | Result |  | Correct: Insulin expired | Incorrect (failure of insulin not detected). |

Table 3 shows a detailed comparison between the methods of this disclosure (sum of P(temp) method), and the preset time-temperature settings of prior art, such as RE 36,200. In this example, the insulin data from the case "b" thermal cycling example discussed previously, has been interpreted both by the methods of this disclosure, and by the fixed time-fixed temperature alarm threshold values of prior art. Note that the methods of the present invention are able to accurately function in variable thermal environments, and properly detect that the ultralente insulin has been somewhat degraded by an intermediate level of exposure to a temperature of 17° C.

By contrast, the methods of prior art fail in this situation. Here, the same data are analyzed using three possible fixed time and fixed temperature alarm criterion. Note that in this situation, none of the alarms of prior art will trigger properly. An alarm set to trigger after a fixed time at 17° C. will trigger at 11,066 hours, which is too long. An alarm set to trigger at 4611 hours at 22° C. will never trigger because, in this example, the insulin was never stored at 22° C. An alarm set to trigger at 25° C. will trigger at 2912 hours, which is also too long, because, in this example, the insulin went bad at only 2305 hours. Thus the fixed-time fixed-temperature alarm method is incapable of precisely modeling the storage characteristics of a material with a simple exponential decay curve in a simple thermal cycling situation. When materials with more complex stability profiles are used in more complex thermal environments, the improvement of the present invention over the prior art can become even more significant.

For the extreme temperature situation "c", consider a diabetic traveler who has packed insulin in his suitcase. Unknown to the traveler, the suitcase was stored in baggage truck exposed to the hot sun, and thus encountered temperatures known to rapidly degrade insulin (here assumed to be over 41° C.). Without a time-temperature monitor, the traveler would assume that the insulin was still good, and expose himself to risk by taking degraded material. By contrast, even if the insulin was totally fresh, with a thermal history of only three previous hours of shelf life storage at 4° C., the indicator would record:

$$B=0=165984-165981(L)-1(3) \qquad \text{(Equation 10)}$$

L=165981/165981
L=1 hour

Thus, in this example, assuming any meaningful prior thermal history, exposure to extreme temperature conditions over 1 hour will trigger the time-temperature monitor. In the case of zero prior thermal history, then exposure to extreme temperature conditions over two hours will trigger the monitor. By the proper choice of coefficients, essentially any desired triggering sensitivity may be achieved.

As previously disclosed, to make these calculations as simple to show as possible, the time resolution (granularity) of the temperature readings was taken on a one P(temp) determination per hour. For most real-world uses, however, P(temp) should be determined on a more frequent basis (finer granularity), such as one P(temp) reading every minute or every few minutes.

EXAMPLE 2

Other Drug Monitoring Applications

There are a number of medically important antibiotics, such as the P-Lactam antibiotics (which include Ceftazidime, Cefepime, Imipenem, Meropenem, Cefpirome, and others), which would be most effective if the drugs could be administered by continuous infusion to ambulatory patients. Such continuously infused antibiotics would be highly useful for treating cystic fibrosis, immunocompromised chemotherapy patients (who are at risk for sepsis), and many other conditions.

However due to the poor thermal stability of the β-Lactam antibiotics, current continuous infusion pump (either mechanical or elastomeric) technology is inadequate. In the liquid form, many of the β-Lactam drugs deteriorate after only a few hours of exposure to temperatures above 25° C. Since body temperature is 37° C., conventional ambulatory infusion pumps, which usually are worn underneath clothing, typically expose such drugs to unacceptable levels of thermal stress.

These issues are discussed in detail in Viaene et. al., Antimicrobial Agents and Chemotherapy, August 2002, p. 2327–2332; and Baririan, et, al., *Journal of Antimicrobial Chemotherapy* (2003) 51, 651–658.

The time-temperature monitoring technology of the present disclosure is well suited to address these issues.

Here, the drug of interest may be incorporated into syringes, elastomeric pump bags, or other container, and incorporated into an ambulatory infusion pump apparatus. This infusion pump apparatus will also contain a time-temperature monitoring unit, programmed to match the thermal stability profile of the drug. This time-temperature unit may be part of the drug storage container, or part of the infusion pump. Using such technology, temperature sensitive drugs may be safely used, and the electronic time-temperature unit will warn the user, and possibly shutdown the pump, if the drug has deteriorated to an unacceptable level.

To extend the storage lifetime of the drug in the infusion pump, it may also be desirable to incorporate active cooling means into the infusion pump apparatus. Such means may be simple cold packs (ice, or chemical cold-pack). Alternatively, it may be desirable to use active electronic cooling, such as Peltier heat pumps, and the like, which may be incorporated into the pump and prolong the drug's storage lifetime.

What is claimed is:

1. A unitized electronic time-temperature indicator device for rapidly assessing the acceptability of an external material's thermal history,
    said device containing computational means, and a temperature measurement means;
    wherein said device periodically samples the temperature and computes a function of temperature that is continually operative throughout the relevant temperature monitoring range of the device;
    and wherein said function of temperature approximates the impact that the relevant temperature, for that period's length of time, has on a detectable property of said material;
    and wherein said computational means generate a running sum of said function of temperature over time;
    and wherein said function of temperature resides with said unitized device;
    and wherein the granularity of the function of temperature is small enough, and the frequency of time measurements is often enough, as to substantially approximate the impact of time and temperature on the detectable property of said material;
    and in which said running sum is compared to a reference value, and the result of said comparison is used to generate an output signal indicative of the fitness for use of said material.

2. The device of claim 1, in which the output signal is a visual output signal.

3. The device of claim 1, in which the output signal is chosen from the group of visual output signals, vibration signals, sonic signals, radiofrequency signals, electrical signals, or infra-red signals.

4. The device of claim 1, further containing means to enable the function of temperature and reference value to be automatically programmed into an assembled device.

5. The device of claim 1, in which the computational means is a microprocessor, the device is continually powered throughout its use lifetime, and the power means is chosen from the group of battery, storage capacitor, thermal, photoelectric, AC power, or radio frequency means.

6. The device of claim 1, in which the function of temperature has a temperature resolution granularity of 10° C. or smaller, and the periodicity of sampling has a time resolution granularity of 2 hours or smaller.

7. The device of claim 1, in which the display means convey information pertaining to the fractional remaining stability lifetime of material that has not yet expired, or the fractional completion of a time-temperature dependent incubation reaction.

8. The time-temperature device of claim 1, incorporated into a material dispensing device, in which the time-temperature device signals if the material should be dispensed or not depending upon the acceptability of the material's thermal history.

9. The device of claim 1, in which said function of temperature is a stability bank function.

10. A unitized electronic time-temperature indicator device for rapidly assessing the acceptability of an external material's thermal history,
   said device containing computational means, and a temperature measurement means;
   wherein said device periodically samples the temperature and computes a function of temperature that is continually operative throughout the relevant temperature monitoring range of the device;
   and wherein said function of temperature approximates the impact that the relevant temperature, for that period's length of time, has on a detectable property of said material;
   and wherein said computational means generate a running sum of said function of temperature over time;
   and wherein said function of the temperature resides with said unitized device;
   and wherein the granularity of the function of temperature is small enough, and the frequency of time measurements is often enough, as to substantially approximate the impact of time and temperature on the detectable property of said material;
   and in which said running sum is compared to a reference value, and the result of said comparison is used to generate a visual output indicative of the fitness for use of said material.

11. The device of claim 10, in which the function of temperature and reference value may be programmed into the assembled device by a replaceable memory chip, electronic data transfer, infrared data transfer, or radio frequency data transfer.

12. The device of claim 10, in which the computational means is a microprocessor, the device is continually powered throughout its use lifetime, and the power means is chosen from the group of battery, storage capacitor, thermal, photoelectric, AC power, or radio frequency means.

13. The device of claim 10, in which the function of temperature has a temperature resolution granularity of 10° C. or smaller, and the periodicity of sampling has a time resolution granularity of 2 hours or smaller.

14. The device of claim 10, in which the display means convey information pertaining to the fractional remaining stability lifetime of material that has not yet expired, or the fractional completion of a time-temperature dependent incubation reaction.

15. The time-temperature device of claim 10, incorporated into a material dispensing device, in which the time-temperature device signals if the material should be dispensed or not depending upon the acceptability of the material's thermal history.

16. The device of claim 10, in which said function of temperature is a stability bank function.

17. A unitized electronic time-temperature indicator device for rapidly assessing the acceptability of an external material's thermal history,
   said device containing computational means, and a temperature measurement means;
   wherein said device periodically samples the temperature and computes a function of temperature that is continually operative throughout the relevant temperature monitoring range of the device;
   and wherein said function of temperature approximates the impact that the relevant temperature, for that period's length of time, has on a detectable property of said material;
   and wherein said computational means generate a running sum of said function of temperature over time;
   and wherein said function of the temperature resides with said unitized device;
   and wherein the granularity of the function of temperature is small enough, and the frequency of time measurements is often enough, as to substantially approximate the impact of time and temperature on the detectable property of said material;
   and in which said running sum is compared to a reference value, and the result of said comparison is used to generate a visual output indicative of the fitness for use of said material, and the device contains means to allow the function of temperature and reference value to be automatically programmed into an assembled device.

18. The device of claim 17, in which the function of temperature and reference value may be programmed into the assembled device by a replaceable memory chip, electronic data transfer, infrared data transfer, or radio frequency data transfer.

19. The device of claim 17, in which the computational means is a microprocessor, the device is continually powered throughout its use lifetime, and the power means is chosen from the group of battery, storage capacitor, thermal, photoelectric, AC power, or radio frequency means.

20. The device of claim 17, in which the function of temperature has a temperature resolution granularity of 10° C. or smaller, and the periodicity of sampling has a time resolution granularity of 2 hours or smaller.

21. The device of claim 17, in which the display means convey information pertaining to the fractional remaining stability lifetime of material that has not yet expired, or the fractional completion of a time-temperature dependent incubation reaction.

22. The time-temperature device of claim 17, incorporated into a material dispensing device, in which the time-temperature device signals if the material should be dispensed or not depending upon the acceptability of the material's thermal history.

23. The device of claim 17, in which said function of temperature is a stability bank function.

24. A unitized electronic time temperature indicator device for rapidly assessing the acceptability of an external material's thermal history;
   wherein the device contains a microprocessor, a temperature sensor, time monitoring means, and stability memory means;
   said microprocessor and said time monitoring means controlling the time intervals between successive temperature sensor measurements;
   said temperature sensor detecting a temperature environmental condition affecting the life of said material;
   said stability memory means residing with said unitized device;
   said stability memory means storing a function of temperature;
   said function of temperature calculating the impact that the environmental temperature, over the interval of time between successive temperature sensor measurements, has on a detectable property of said material;

said function of temperature accepting the temperature environmental condition from the temperature sensor as an input;

said function of temperature using data retrieved from said stability memory means in conjunction with said microprocessor to calculate the numeric impact that said input temperature has on the detectable property of said material, and returning this numeric impact value as a numeric output;

said function of temperature capable of generating a numeric impact value output in response to all input temperature values throughout the relevant temperature monitoring range of the device;

said function of temperature having an ability to distinguish between different environmental temperatures with a granularity that is small enough as to accurately approximate the impact of said environmental temperature on the detectable property of said material;

said interval of time between successive temperature sensor measurements being short enough as to allow said function of temperature to accurately follow time changes in said environmental temperature;

and wherein said microprocessor generates a running total of said numeric impact value output of said function of temperature over time;

and in wherein said microprocessor compares said running total to a reference value;

and wherein the microprocessor uses the result of said comparison to generate an output signal indicative of the fitness for use of said material;

whereby said material can be evaluated for fitness for use by storing said temperature sensor close enough to said material to as to enable the temperature sensor to monitor the temperature history of the material;

whereby the remaining life of said material is evaluated in accordance with said output signal.

25. The device of claim 24, in which the output signal is a visual output signal.

26. The device of claim 24, in which the output signal is chosen from the group of visual output signals, vibration signals, sonic signals, radio frequency signals, electrical signals, or infra-red signals.

27. The device of claim 24, further containing means to enable the function of temperature and reference value to be automatically programmed into an assembled device.

28. The device of claim 24, in which said device additionally contains means to allow the function of temperature and reference value to be automatically programmed into an assembled device, said automatic programming means selected from the group consisting of replaceable memory chip, electronic data transfer, infrared data transfer, or radio frequency data transfer.

29. The device of claim 24, in which the device is continually powered throughout its use lifetime, and the power means is chosen from the group of battery, storage capacitor, thermal, photoelectric, AC power, or radio frequency means.

30. The device of claim 24, in which the function of temperature has a temperature resolution granularity of 10° C. or smaller and the time intervals between successive temperature sensor measurements has a time resolution granularity of 2 hours or smaller.

31. The device of claim 24, in which the display means convey information pertaining to the fractional input stability lifetime of material that has not yet expired, or the fractional completion of a time-temperature dependent incubation reaction.

32. The device of claim 24, incorporated into a material dispensing device, in which the time-temperature device signals if the material should be dispensed or not depending upon the acceptability of the material's thermal history.

33. A method for rapidly determining fitness for use of a material, said method comprising;

storing said material in association with a unitized electronic time-temperature indicator device;

said material being external to said unitized electronic time-temperature indicator device;

said device containing computational means, and a temperature measurement means;

wherein said device periodically samples the temperature of said material's environment and computes a function of temperature that is continually operative throughout the relevant temperature monitoring range of the device;

and wherein said function of temperature approximates the impact that the relevant temperature, for that period's length of time, has on a detectable property of said material;

and wherein said computational means generate a running sum of said function of temperature over time;

and wherein said function of temperature resides with said unitized device;

and wherein the granularity of the function of temperature is small enough, and the frequency of time measurement is often enough, as to substantially approximate the impact of time and temperature on the detectable property of said material;

and in which said running sum is compared to a reference value, and the result of said comparison is used to generate an output signal indicative of the fitness for use of said material.

* * * * *